United States Patent
Ono et al.

(10) Patent No.: US 9,197,397 B1
(45) Date of Patent: Nov. 24, 2015

(54) FLIP-FLOP-BASED CLOCK DESKEW CIRCUIT

(71) Applicant: Oracle International Corporation, Redwood City, CA (US)

(72) Inventors: Tarik Ono, Redwood City, CA (US); Suwen Yang, Mountain View, CA (US); Mark R. Greenstreet, Vancouver (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/329,272

(22) Filed: Jul. 11, 2014

(51) Int. Cl.
*H04L 7/00* (2006.01)

(52) U.S. Cl.
CPC .................................... *H04L 7/0037* (2013.01)

(58) Field of Classification Search
CPC ............. G11C 11/4076; G11C 7/1051; G11C 7/1066; G11C 7/1078; G11C 7/1093; H04L 7/0008; H04L 25/0272; H04L 7/0012; H04L 7/005; H04L 7/033; H04L 7/0091; H04L 7/0338; G01R 31/318572; H03L 7/00
USPC ......... 375/354, 356, 359, 360, 362, 371, 372; 327/141, 144, 152, 165, 166, 172, 176, 327/100, 1, 2, 3, 12
See application file for complete search history.

(56) References Cited

U.S. PATENT DOCUMENTS

| | | | |
|---|---|---|---|
| 6,486,721 B2 | 11/2002 | Greenstreet et al. | |
| 2002/0121922 A1* | 9/2002 | Greenstreet et al. | 327/211 |
| 2008/0074162 A1* | 3/2008 | Hsu | 327/205 |

OTHER PUBLICATIONS

Ono et al; "Invention Disclosure: Flip-Flop-based De-Skew Circuit", May 9, 2013.

* cited by examiner

*Primary Examiner* — Vineeta Panwalkar
(74) *Attorney, Agent, or Firm* — Park, Vaughan, Fleming & Dowler LLP; A. Richard Park

(57) ABSTRACT

A clock deskew circuit for transferring data from a first clock domain to a second clock domain. This circuit includes a data path, which has: a transmitter latch controlled by a transmitter clock in a first clock domain; a receiver latch controlled by a receiver clock in a second clock domain; and an intermediate latch coupled between the transmitter latch and the receiver latch. The transmitter clock and the receiver clock have an unknown phase offset. The circuit additionally includes a control circuit coupled between the transmitter clock and the receiver clock, and generates a control clock for the immediate latch based on the transmitter clock and the receiver clock. The control circuit selects between a first operation mode and a second operation mode for the data path circuit based at least on the phase relationship of the control clock with respect to the transmitter clock and the receiver clock.

17 Claims, 6 Drawing Sheets

CLOCK DESKEW CIRCUIT 100

FLIP-FLOP-BASED CLOCK DESKEW CIRCUIT

BACKGROUND

1. Field of the Invention

This disclosure generally relates to circuits and techniques for communicating data from a transmitter to a receiver. More specifically, this disclosure relates to circuits and techniques that allow data from one clock domain to be safely captured in another clock domain, wherein the two clock domains have the same clock frequency, but an unknown phase offset.

2. Related Art

To simplify the designs of complex integrated circuits such as system-on-chip (SoC) or processors, circuit designers typically partition large circuits into several smaller circuits such that each has its own "clock domain." Often, all of these clock domains receive their clock signals from a common clock source so that the clock frequency is the same for these different clock domains. However, because distribution delays of the common clock signal to various clock domains vary from one domain to another domain, the phase difference between different clock domains can be significant and difficult to determine. Consequently, efficient interface circuits that can compensate for such clock skews have to be provided between different clock domains so that data can be transferred reliably between these different clock domains. Some existing systems make use of first-in-first-out (FIFO) buffers to transfer data between different clock domains. However, FIFO buffers are complicated to implement and can introduce additional delay in data transfer between the different clock domains.

Other existing techniques provide an interface latch, and an associated latch control circuit between two clock domains for allowing data to cross from one clock domain to another. These techniques rely on the fact that there are two valid timing windows where the interface latch should receive the control signal from the latch control circuit in order to safely transfer data from one clock domain to another. During circuit initialization, the existing techniques continuously adjust a variable delay circuit in an attempt to locate the larger of the two valid timing windows. However, these existing techniques require both a complex initialization routine and latch control logic that uses functions implemented through dynamic CMOS circuits or C-elements that are not available in typical cell libraries.

Hence, what is needed is a circuit and technique that facilitate reliable data transfer between different clock domains without the above-described problems.

SUMMARY

The disclosed embodiments provide a clock deskew circuit for safely transferring data from a first clock domain to a second clock domain. This clock deskew circuit includes a data path circuit, which further comprises: a transmitter latch controlled by a transmitter clock in a first clock domain; a receiver latch controlled by a receiver clock in a second clock domain; and at least one intermediate latch coupled between the transmitter latch and the receiver latch. Note that the transmitter clock and the receiver clock have an unknown phase offset. The clock deskew circuit additionally includes a control circuit coupled between the transmitter clock and the receiver clock, and configured to generate a control clock for the at least one immediate latch based on both the transmitter clock and the receiver clock. During operation, the control circuit can select between a first operation mode and a second operation mode for the data path circuit based at least on the phase relationship of the control clock with respect to the transmitter clock and the receiver clock. When operating in the first operation mode, a triggering transition of the control clock occurs after the latest triggering transition of the transmitter clock but before the next triggering transition of the receiver clock. When operating in the second operation mode, a triggering transition of the control clock occurs after the latest triggering transition of the receiver clock but before the next triggering transition of the transmitter clock.

In some embodiments, if the data path circuit initially operates in the first operation mode, the control circuit selects the first operation mode for the data path circuit if the triggering transition of the control clock occurs at least a first predetermined time before the next triggering transition of the receiver clock. Otherwise, the control circuit selects the second operation mode for the data path circuit.

In some embodiments, the control circuit selects the second operation mode by ignoring the next triggering transition of the receiver clock.

In some embodiments, if the data path circuit initially operates in the second operation mode, the control circuit selects the second operation mode for the data path circuit if the triggering transition of the control clock occurs at least a second predetermined time before the next triggering transition of the transmitter clock. Otherwise, the control circuit selects the first operation mode for the data path circuit. (Note that the first operation mode has a lower latency than the second operation mode.)

In some embodiments, the control circuit selects the first operation mode by ignoring the next triggering transition of the transmitter clock.

In some embodiments, the control circuit includes: a first flip-flop controlled by the transmitter clock, wherein the first flip-flop is configured to output a delayed version of the transmitter clock; a second flip-flop controlled by the receiver clock, wherein the second flip-flop is configured to output a delayed version of the receiver clock; and a logic gate which receives the delayed version of the transmitter clock and the delayed version of the receiver clock and generates the control clock.

In some embodiments, the control circuit further includes a delay circuit coupled between the logic gate and the first and second latches, wherein the delay circuit receives the control clock from the logic gate and generates a delayed version of the control clock which is coupled to the reset inputs of the first and second latches.

In some embodiments, both the data input of the first latch and the data input of the second latch are set to logic high.

In some embodiments, the logic gate is an AND gate or a NAND gate.

In some embodiments, the delay circuit causes a first predetermined delay to the control clock such that a clock transition in either the transmitter clock or the receiver clock that occurs during a timing period from a triggering transition of the control clock to the end of the first predetermined delay after the triggering transition is ignored by the control circuit.

Note that the difference between the first delay and the second delay should be large enough to account for jitter and changes to the relative skew. Moreover, the delay from a transmitter clock event, through the first flip-flop from, and through the logic gate should be sufficient to ensure the data set-up requirement for the intermediate data latch. Also, the corresponding delay of a receiver clock event through the control circuitry should be large enough to guarantee the hold-time requirement for the receiver's data latch.

In some embodiments, the delay circuit is configured with a second predetermined delay which is significantly shorter than the first delay. The control circuit switches from the first predetermined delay to the second predetermined delay after the control circuit has selected either the first operation mode or the second operation mode for the data path circuit.

In some embodiments, the transmitter clock and the receiver clock have the same frequency.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Embodiments of the present disclosure provide a clock deskew circuit that allows data to reliably cross from a transmitter clock domain of a transmitter circuit to a receiver clock domain of a receiver circuit, wherein both clock domains have the same frequency but an unknown phase offset. In some embodiments, the transmitter circuit is coupled to the receiver circuit through an interface circuit, which includes an interface latch. The interface latch is controlled by a control clock generated by the clock deskew circuit. In one embodiment, the clock deskew circuit receives both the transmitter clock and the receiver clock, and is configured to generate the control clock based on both the transmitter clock and the receiver clock.

In some embodiments, the clock deskew circuit operates to select between a transmitter-clock-last operation (TCL) mode and a receiver-clock-last operation (RCL) mode for safely transferring data from the transmitter circuit to the receiver circuit through the intermediate latch. More specifically, in the TCL mode, a latch-triggering transition of the control clock occurs after the latest latch-triggering transition of the transmitter clock but before the next latch-triggering transition of the receiver clock. In the RCL mode, a latch-triggering transition of the control clock occurs after the latest latch-triggering transition of the receiver clock but before the next latch-triggering transition of the transmitter clock. Note that to correctly transfer data from the transmitter to the receiver, the latch-triggering transition of the control clock needs to occur within a valid timing window in each of the operation modes.

Because of the unknown phase offset, the clock deskew circuit may start to operate in either the TCL mode or the RCL mode, even if the initial mode is unsafe. In some embodiments, the clock deskew circuit chooses a safe operation mode for data transfer during an initialization process. More specifically, if the clock deskew circuit initially operates in the TCL mode, the clock deskew circuit can switch to the RCL mode if the TCL mode does not have a valid timing window for the triggering transition of the control clock. Similarly, if the clock deskew circuit initially operates in the RCL mode, the clock deskew circuit can switch to the TCL mode if the RCL mode does not have a valid timing window for the triggering transition of the control clock.

We now describe embodiments of clock deskew circuit and its operation in more detail.

Figure 1:
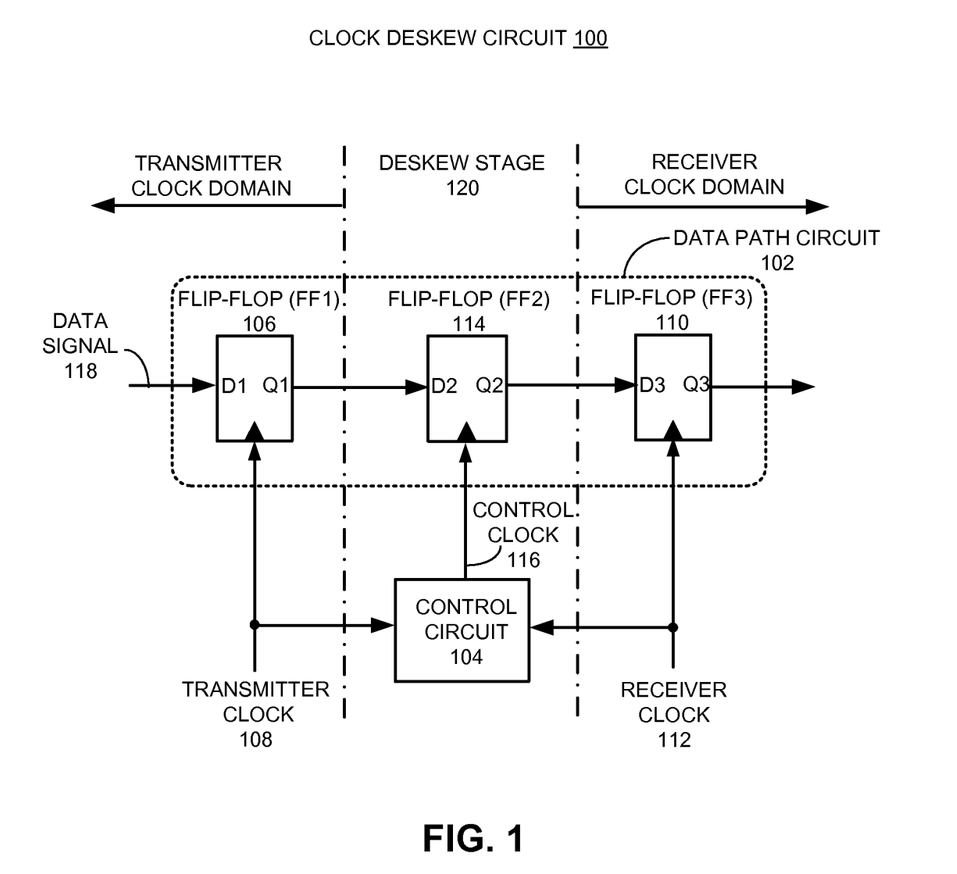
FIG. 1 illustrates a clock deskew circuit which facilitates safe data transfer between two clock domains having an unknown phase offset in accordance with an embodiment of the present disclosure.

FIG. 1 illustrates a clock deskew circuit 100 which facilitates safe data transfer between two clock domains having an unknown phase offset in accordance with an embodiment of the present disclosure. As shown in FIG. 1, clock deskew circuit 100 comprises a data path circuit 102 that is coupled to a control circuit 104. Data path circuit 102 further includes: a transmitter latch, e.g., D flip-flop 106 (also referred to as "FF1" hereinafter), controlled by a transmitter clock 108 in the transmitter clock domain (i.e., the first clock domain); a receiver latch, e.g., D flip-flop 110 (also referred to as "FF3" hereinafter), controlled by a receiver clock 112 in the receiver clock domain (i.e., the second clock domain), wherein transmitter clock 108 and receiver clock 112 have an unknown phase offset but can have the same frequency. In one embodiment, transmitter clock 108 and receiver clock 112 are derived from the same clock source. Data path circuit 102 additionally includes an intermediate latch, e.g., D flip-flop 114 (also referred to as "FF2" hereinafter), which is coupled between the output Q1 of D-flip flop 106 (FF1) and the input D3 of D flip-flop 110 (FF3).

Control circuit 104 is coupled between transmitter clock 108 and receiver clock 112 and is configured to generate a control clock 116 for D flip-flop 114 (FF2) based on both transmitter clock 108 and receiver clock 112. Control circuit 104 functions to ensure that data items can be safely transferred from the transmitter clock domain to the receiver clock domain even when the two clock domains have an unknown phase offset. In one embodiment, control circuit 104 is configured to select between a transmitter-clock-last operation (TCL) mode and a receiver-clock-last operation (RCL) mode while transferring data signal 118 from FF1 to FF3 through FF2.

Although the system illustrated in FIG. 1 is described below as using a specific type of D flip-flop to implement storage elements FF1, FF2, and FF3 in data path circuit 102, the present invention can work equally well when different types of D flip-flops, other types of flip-flops or other types of latch-based storage elements are used in place of the D flip-flops described below. For example, embodiments of clock deskew circuit 100 are described below assuming that FF1, FF2, and FF3 are rising-edge triggered flop-flops. However, the present invention can alternatively use falling-edge triggered flip-flops to implement FF1, FF2, and FF3. Also note that FF2 can be implemented with a transparent latch. (This could be done to lower the latency of the interface.)

During operation, an input data signal 118 is first stored in FF1 using transmitter clock 108. Input data signal 118 is eventually transmitted from the transmitter clock domain to the receiver clock domain where it is stored in FF3 using receiver clock 112. Because transmitter clock 108 and receiver clock 112 have an unknown phase offset, circuit 100 uses a deskew stage 120, which includes intermediate latch FF2 and control circuit 104 to compensate for the phase offset and to ensure that data signal 118 can reliably cross the clock domains. Note that deskew stage 120, which is inserted between the transmitter clock domain and the receiver clock domain, operates under control clock 116 which has the same frequency as transmitter clock 108 and receiver clock 112, but a phase that is different from both clocks 108 and 112.

Note that a flip-flop typically has a required setup time, hold time and clock-to-Q delay. The setup time is the minimum amount of time a data value has to be stable before a triggering clock edge so that the data are reliably sampled by the clock. The hold time is the minimum amount of time a data value has to be stable after a triggering clock edge so that the data are reliably sampled. The clock-to-Q delay is the delay between a triggering clock edge that captures the data value and when the data value is available at the output of the flip-flop. Note that in FIG. 1, the setup time, the hold time, and the clock-to-Q delay of each of the flip-flops in circuit 100 impose timing constraints on control clock 116.

Figure 2:
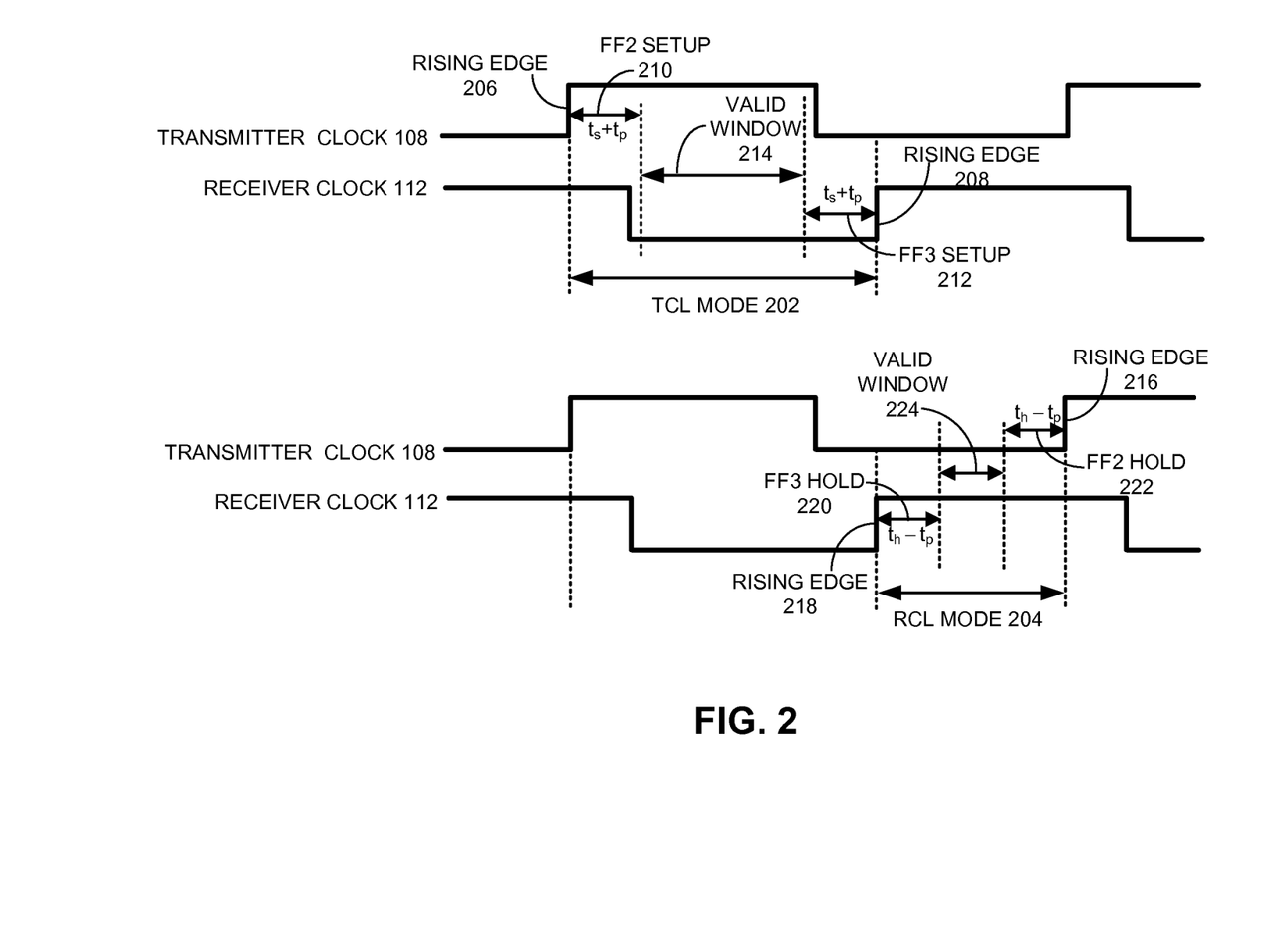
FIG. 2 presents timing diagrams for an exemplary transmitter-clock-last (TCL) mode of the clock deskew circuit and an exemplary receiver-clock-last operation (RCL) mode of the clock deskew circuit in accordance with an embodiment of the present disclosure

Generally, control clock 116 can operate in one of two modes: transmitter-clock-last operation (TCL) mode or receiver-clock-last operation (RCL) mode. FIG. 2 presents timing diagrams for an exemplary TCL mode 202 of deskew circuit 100 and the associated timing requirements (the upper timing diagram), and an exemplary RCL mode 204 of deskew circuit 100 and the associated timing requirements (the lower timing diagram) in accordance with an embodiment of the present disclosure. Note that while FIG. 2 is discussed in the context of the illustrated phase relationship between transmitter clock 108 and receiver clock 112, the discussion is equally applicable to any other phase relationship between transmitter clock 108 and receiver clock 112.

In a TCL mode, a new data value is captured by FF1 on a rising edge 206 of transmitter clock 108, and a subsequent rising edge of control clock 116 (not shown) captures the same data value in FF2. The next rising edge 208 of receiver clock 112 then captures the same data value in FF3. Note that for the data to safely move from FF1 to FF2, the setup time of FF2 has to be met. More specifically, after a rising edge of transmitter clock 108, it takes a newly captured data value "clock-to-Q" delay to reach the output of FF1, and some additional propagation delay to reach the input of FF2. We use $t_p$ to denote this clock-to-Q delay plus the additional propagation delay. If $t_s$ is the setup time of FF2, then we need a minimum of $t_s + t_p$ time between rising edge 206 of transmitter clock 108 and a subsequent rising edge of control clock 116 to safely convey the newly captured data value from FF1 to FF2. This timing constraint is illustrated in FIG. 2 as FF2 setup 210 in the upper timing diagram.

Similarly, for the same data value to reliably transmit from FF2 to FF3, the propagation delay through FF2 and the setup time of FF3 have to be met. For the convenience of discussion, we assume all flip-flops in circuit 100 have the same setup time, hold time and clock-to-Q delay, such as in the case when identical flip-flips are used. However, the present invention works equally well when different flip-flips may have different setup times, hold times and clock-to-Q delays. Hence, we need a minimum of $t_s + t_p$ time between the rising edge of control clock 116 and rising edge 208 of receiver clock 112 to safely convey the newly captured data value from FF2 to FF3. This timing constraint is illustrated in FIG. 2 as FF3 setup 212 in the upper timing diagram. Note that timing constraints 210 and 212 impose a valid timing window ("valid window" hereinafter) 214 for the rising edge of control clock 116 to operate properly in TCL mode 202. In TCL mode 202, valid window 214 for control clock 116 is defined by the setup times of FF2 and FF3, and the propagation delays of FF1 and FF2.

In an RCL mode, a new data value is again captured by FF1 on a rising edge 216 of transmitter clock 108. However, before the new data value is captured by FF2, the previous data value in FF2 is first captured by FF3. Only then can FF2 be overwritten with the new data value in FF1. If FF2 is overwritten too soon after a rising edge 218 of receiver clock 112, then the hold time of FF3 is not met. Similarly, if a new data value is written into FF1 too soon before FF2 has captured the previous data value, then the hold time of FF2 is not met. Because it takes $t_p$ time for data to move from one flip-flop to the next, we can subtract that time from the hold time requirement. Hence, if $t_h$ is the hold time for a given flip-flop, then the next rising edge of control clock 116 (not shown) needs to occur at least $t_h - t_p$ time after rising edge 218 of receiver clock 112. This timing constraint is illustrated in FIG. 2 as FF3 hold 220 in the lower timing diagram.

Similarly, in the RCL mode the next rising edge 216 of transmitter clock 108 needs to occur at least $t_h - t_p$ time after the rising edge of control clock 116. This timing constraint is illustrated in FIG. 2 as FF2 hold 222 in the lower timing diagram. These two timing constraints impose a valid window 224 for the rising edge of control clock 116 to operate properly in RCL mode 204. Hence, in RCL mode 204, valid window 224 for control clock 116 is defined by the hold times of FF2 and FF3, and the propagation delays of FF1 and FF2.

Also, by observing the time diagrams in FIG. 2, one would appreciate that the clock period has to be sufficiently long to ensure that control clock 116 can find a valid window for a given operation mode. More specifically, valid window 214 in TCL mode 202 only exists if the time between rising transmitter clock edge 206 and the subsequent rising receiver clock edge 208 is at least $2 \times (t_s + t_p)$. Similarly, valid window 224 in RCL mode 204 only exists if the time between rising receiver clock edge 218 and the subsequent rising transmitter clock edge 216 is at least $2 \times (t_h - t_p)$. In addition, deskew circuit 100 needs to be able to operate at the same clock frequency of transmitter clock 108 (or receiver clock 112), because it has to generate a rising edge on control clock 116 every clock cycle.

Figure 3:
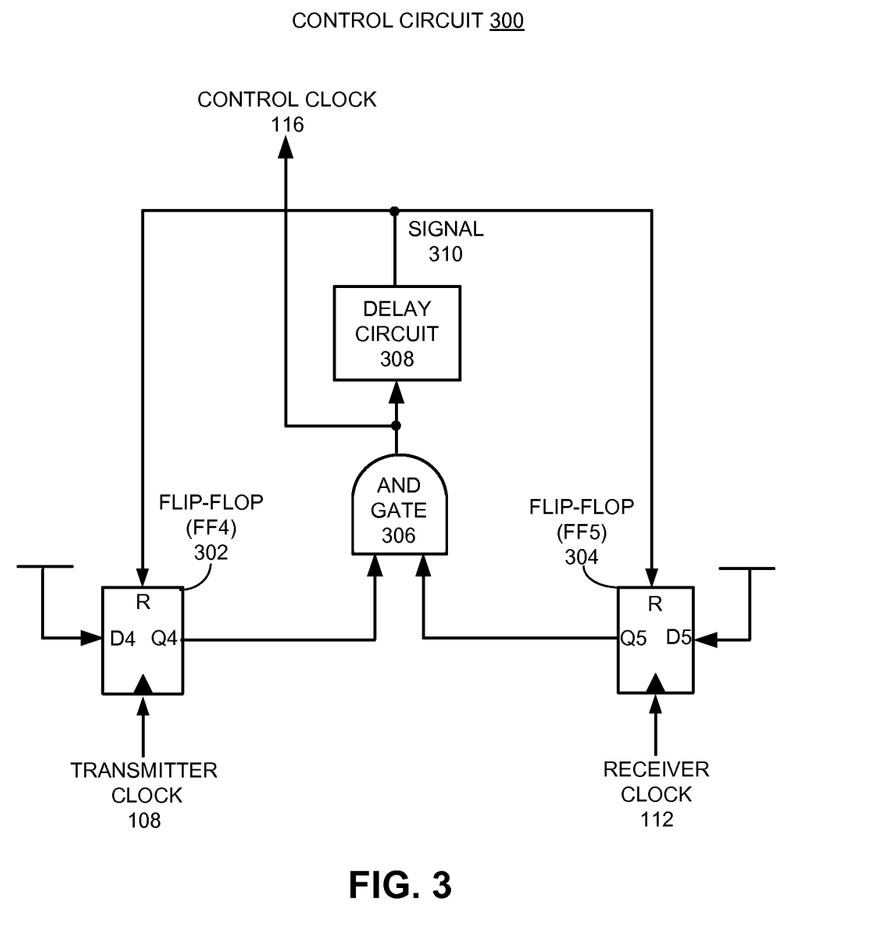
FIG. 3 illustrates an embodiment of the control circuit within the clock deskew circuit in accordance with an embodiment of the present disclosure.

FIG. 3 illustrates an embodiment of control circuit 104 within clock deskew circuit 100 in accordance with an embodiment of the present disclosure. As can be seen in FIG. 3, control circuit 300 comprises a first D flip-flop 302 (also referred to as "FF4" hereinafter) controlled by transmitter clock 108 and a second D flip-flop 304 (also referred to as "FF5" hereinafter) controlled by receiver clock 112. In some embodiments, instead of directly using transmitter clock 108 and receiver clock 112 as the respective clock, FF4 can use a pre-delayed transmitter clock 108' as the clock input, while FF5 can use a pre-delayed receiver clock 112' as the clock input. In one embodiment, pre-delayed transmitter clock 108' and pre-delayed receiver clock 112' are delayed by the same amount from the respective clocks 108 and 112. Although control circuit 300 is described using D flip-flops, FF4 and FF5 can be implemented using other types of flip-flops available from a standard cell library. In general, any circuit component that has the capability of being set in response to a signal edge, and being reset in response to a signal level can be used in place of FF4 and FF5. (For example, a self-resetting CMOS circuit described in U.S. Pat. No. 6,486,727 can be used in place of FF4 and FF5.)

Control circuit 300 also includes an AND gate 306 and a delay circuit 308. The outputs of FF4 and FF5 (i.e., Q4 and Q5) are coupled to the inputs of AND gate 306, which outputs control clock 116 (the same control signal in FIG. 1). The output of AND gate 306 is also the input to delay circuit 308, which outputs a delayed version of control clock 116, referred to as "signal 310." Note that signal 310 is coupled to both reset inputs of FF4 and FF5 as reset signals. Note also that AND gate 306 may be replaced by a NAND gate coupled in series with an inverter, or by other equivalent logic available from a standard cell library.

Note that the inputs to FF4 and FF5 (i.e., D4 and D5) are tied to logic high. Assume that initially the outputs of FF4 and FF5 are logic low. Hence, a rising edge on transmitter clock 108 causes the output of FF4 to go high, and a rising edge on receiver clock 112 causes the output of FF5 to go high. Once both outputs Q4 and Q5 are logic high, the output of AND gate 306, i.e., control clock 116, goes high. Control clock 116 will stay high until FF4 and FF5 are reset to logic low by the reset signal 310. More specifically, after a predetermined delay set by delay circuit 308, signal 310 goes high, resetting FF4 and FF5 to logic low. In the following discussion, we will see that in deskew circuit 100, clock events that occur before resetting control clock 116 to logic low will be ignored by control circuit 300.

Figure 4:
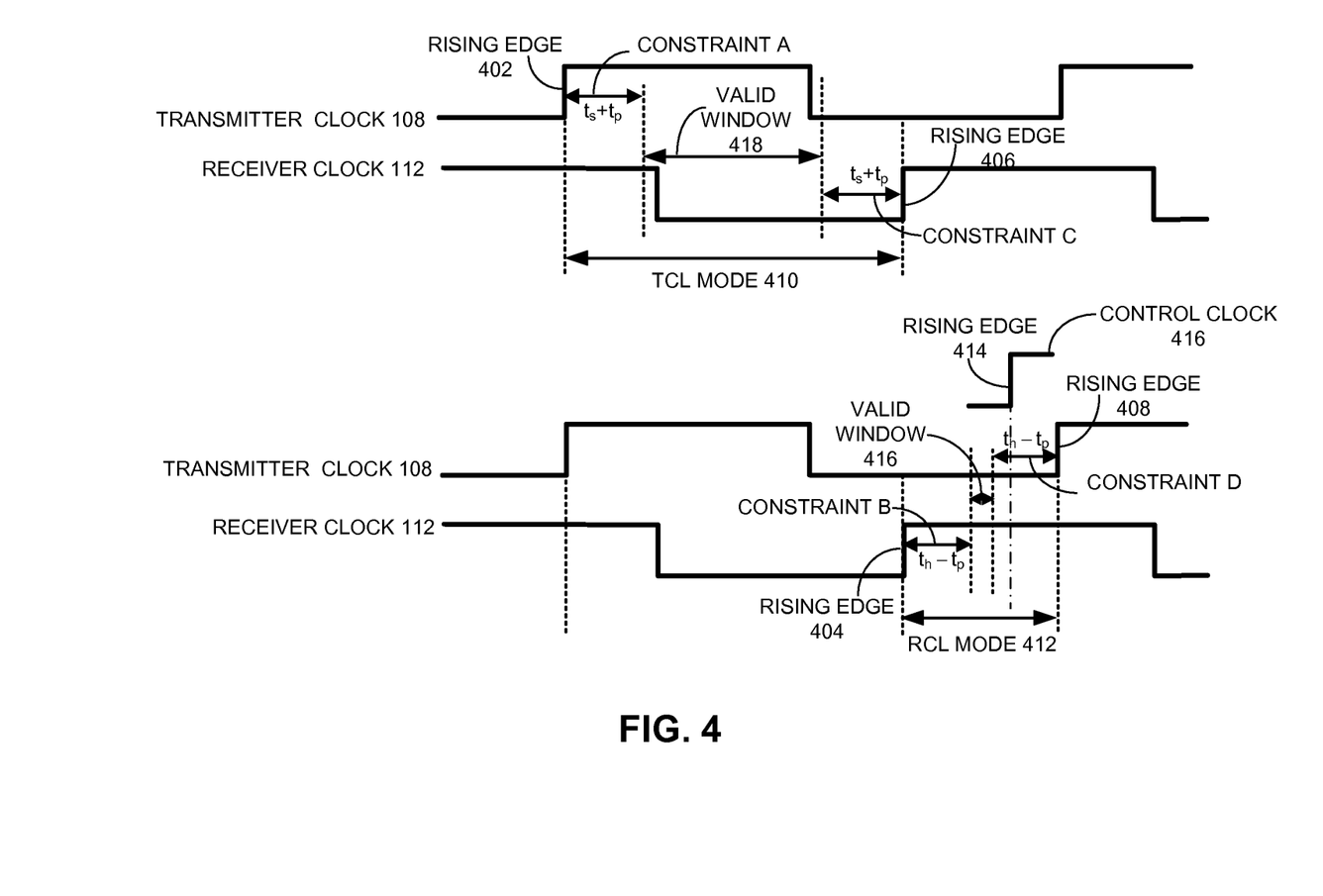
FIG. 4 illustrates how the control circuit functions to satisfy the timing requirements on the control signal and to ensure safe data transfer from the transmitter clock domain to the receiver clock domain.

FIG. 4 illustrates how control circuit 300 functions to satisfy the timing requirements on control clock 116 and to ensure safe data transfer from the transmitter clock domain to the receiver clock domain. In FIG. 4, the FF2 setup time requirement $t_s + t_p$ after rising edge 402 of transmitter clock 108 is referred to as "constraint A;" the FF3 hold time requirement $t_h - t_p$ after rising edge 404 of receiver clock 112 is referred to as "constraint B;" the FF3 setup time requirement $t_s + t_p$ before rising edge 406 of receiver clock 112 is referred to as "constraint C;" and finally the FF2 hold time requirement $t_h - t_p$ before rising edge 408 of transmitter clock 108 is referred to as "constraint D."

Note that because a rising edge in control clock 116 is triggered by either a rising edge of transmitter clock 108 (e.g., rising edge 402) in TCL mode 410 or a rising edge of receiver clock 112 (e.g., rising edge 404) in RCL mode 412, constraints A and B can be conveniently met by delaying transmitter clock 108 and receiver clock 112 before they are used in control circuit 300. Alternatively, a fixed delay on control clock 116 can be used to accomplish these timing requirements. In some embodiments, additional delays may not be necessary if the delay from the input clocks to control clock 116, which includes a clock-to-Q delay and the AND gate propagation delay, is sufficiently long. Note that the hold time $(t_h - t_p)$ is generally less than the setup time $(t_s + t_p)$, so constraint D is usually subsumed when constraint C is met. We now describe how constraint C can be met by using control circuit 300 illustrated in FIG. 3.

As mentioned previously, immediately after the system start, control clock 116 can operate in either the TCL mode or the RCL mode, and may continue to operate in the mode. However, due to unpredictable drift in the phase offset between the phase of the transmitter clock and the phase of the receiver clock, it cannot be guaranteed that a rising edge of control clock 116 is located within the valid window associated with the initial operation mode, especially when the next rising clock edge following the rising edge of control clock 116 happens too soon. For example, if control clock 116 happens to be in the RCL mode initially, the next rising edge of the transmitter clock needs to be at least $t_h - t_p$ after a rising edge of control clock 116 according to constraint D. If the next rising edge of the transmitter clock occurs sooner than $t_h - t_p$, the circuit may fail to work. The lower timing diagram in FIG. 4 illustrates an exemplary control clock 116 in RCL mode 412 which comprises a rising edge 414 that is too close to the next rising edge 408 of transmitter clock 108. This can happen because valid window 416 of RCL mode 412 is very short. In such cases, it is necessary to configure control circuit 300 to ignore the next rising edge event that is too close. In one embodiment, delay circuit 308 in control circuit 300 is configured to ensure that control clock 116 will choose a safe operation mode during an initialization process of the deskew circuit, regardless of the phase relationship between the transmitter clock domain and the receiver clock domain.

In a particular embodiment, delay circuit 308 is configured to cause a sufficiently long delay (referred as "LD" hereinafter) during the initialization process of the deskew circuit, wherein the constant LD ensures that edge events that happen within LD time after a rising edge of control clock 116 are ignored.

For example, if control clock 116 happens to be in the TCL mode at the start, the timing requirement dictates that the next rising edge of the receiver clock has to arrive at least $t_s + t_p$ time after a rising edge of control clock 116. In other words, we want to make control circuit 300 only choose the TCL mode if there is at least $t_s + t_p$ time between the rising edge of control clock 116 and the next rising edge of the receiver clock. By making sure that the LD is greater than $t_s + t_p$, control circuit 300 ensures that if control clock 116 operates under the TCL mode, there is sufficient time between control clock 116 and the next receiver edge event (i.e., placing control clock 116 within a valid window of the TCL mode). Note that to add jitter tolerance to the next rising edge of the receiver clock (e.g., to make sure the circuit still operates correctly even if the next rising edge of the receiver clock arrives a bit early), additional delay margin δ should be added to the LD, so we can set LD=$t_s+t_p+δ$.

On the other hand, if control clock 116 happens to start in the TCL mode, but there is insufficient time between control clock 116 and the receiver clock (i.e., control clock 116 not within a valid window), the predetermined LD of control circuit 300 ensures that control clock 116 will transition from the TCL mode to the RCL mode by ignoring those receiver events that happen too soon. Control clock 116 will work properly in the RCL mode because when the valid window in the TCL mode is nonexistent or too small, the valid window in the corresponding RCL mode will generally be sufficiently large. More specifically, let P be the period of the clocks (which all have the same period). If $P>2(t_s+t_h)$, then the timing requirements for at least one of TCL or RCL must be satisfied.

Similarly, if control clock 116 happens to be in the RCL mode at the start, the timing requirement dictates that the next rising edge of the transmitter clock has to arrive at least $t_h-t_p$ time after a rising edge of control clock 116. In other words, we want to make control circuit 300 only choose the RCL mode if there is at least $t_h-t_p$ time between the rising edge of control clock 116 and the next rising edge of the transmitter clock. By making sure that the LD is greater than $t_h-t_p$, control circuit 300 ensures that if control clock 116 operates under the RCL mode, there is sufficient time between control clock 116 and the next transmitter edge event (i.e., place control clock 116 within the valid window of the RCL mode). Note that to add jitter tolerance to the next rising edge of the transmitter clock (e.g., to make sure the circuit still operates correctly even if the next rising edge of the transmitter clock arrives a bit early), additional delay margin δ should be added to the LD, so we can set LD=$t_h-t_p+δ$.

Note that if control clock 116 happens to start in the RCL mode, but there is insufficient time between control clock 116 and the transmitter clock (e.g., rising edge 414 in FIG. 4), the predetermined LD of control circuit 300 ensures that control clock 116 will transition from the RCL mode to the TCL mode by ignoring those transmitter events that happen too soon. A person skilled in the art will appreciate that when the valid window in the RCL mode is nonexistent or too small, the valid window in the TCL mode will generally be sufficiently large. In the example involving rising edge 414, control circuit 300 ensures that control clock 116 transitions from RCL mode 412 to the valid window 418 within TCL mode 410.

In one embodiment, the LD may be predetermined as the greater one of $(t_s+t_p)$ and $(t_h-t_p)$ plus a margin δ so that control circuit 300 will work properly in both the TCL mode and the RCL mode. In this embodiment, the deskew circuit will not operate in a region where control clock 116 is within LD time of the next rising edge of receiver clock 112 in the TCL mode, or within LD time of the next rising edge of transmitter clock 108 in the RCL mode.

Note that the above timing considerations provide a lower bound for the LD. If the LD is set too long, then it is possible that the circuit will not find a valid window. For example, if the LD is set to be close to a full clock period, and the system starts in an invalid operation mode, the deskew circuit will keep operating under the same invalid operation mode. On the other hand, if the clock period is sufficiently long, then the valid windows are also larger, which allows the LD to be larger. Hence, the upper bound of the LD can depend on the clock speed. In one embodiment, the upper bound of the LD is determined such that control circuit 300 can still find a valid window for a given clock speed.

As discussed above, when control circuit 300 is configured with a proper LD, the deskew circuit is able to find a valid operation mode even if it initially operates in an invalid operation mode. Note that a metastability failure can occur if a transmitter or receiver clock edge occurs close to the falling edge of the reset signal. If this happens, the both the TCL and RCL modes have a skew margin of at least delta when the short-delay is used. Thus, the short-delay circuit will find a valid operating mode.

In some embodiments, control circuit 300 is configured to use the LD during an initialization process of the deskew circuit to find a valid operation mode. Note that the initialization process can be very fast because it typically only takes a few clock cycles to find the valid operation mode. Unlike the existing techniques, this present initialization process does not require a calibration procedure to find the valid operation mode (i.e., a valid window) and does not need to continuously adjust a variable delay line. Hence, the initialization process can be set to complete within a few clock cycles. The exact number of cycles may be predetermined empirically or by modeling. After the initialization process, control circuit 300 can switch from the LD mode to a constant short delay (referred to as "SD" hereinafter) mode. Note that a short delay means that the reset by signal 310 happens closer to a rising edge of control clock 116, but further away from the next clock event of transmitter clock 108 or receiver clock 112. Hence, when the delay is shortened from the LD to the SD, the deskew circuit becomes more jitter tolerant if the next rising edge of the receiver clock or transmitter clock happens early due to jitter.

Similarly to the function of the LD, the SD determines how long control clock 116 stays high during a normal operation mode. To decide a proper value for the SD, we consider the chain of events that follows a rising edge of control clock 116. Once control clock 116 goes high, after the SD time both FF4 and FF5 in FIG. 3 are reset and their outputs go low. This then causes the AND gate output (i.e., control clock 116) to go low. Hence, the timing from control clock 116 rising to falling is as follows: control clock 116 rises→SD time later reset signal 310 rises→flip-flop reset-to-Q time later FF4 and FF5 go low→one AND gate delay later control clock 116 goes low. Hence, control clock 116 has to remain high long enough for the flip-flop controlled by control clock 116 (i.e., FF2 in FIG. 1) to correctly function. This requirement sets the lower limit on the SD value. In some embodiments, the SD value can be set to zero.

Figure 5:
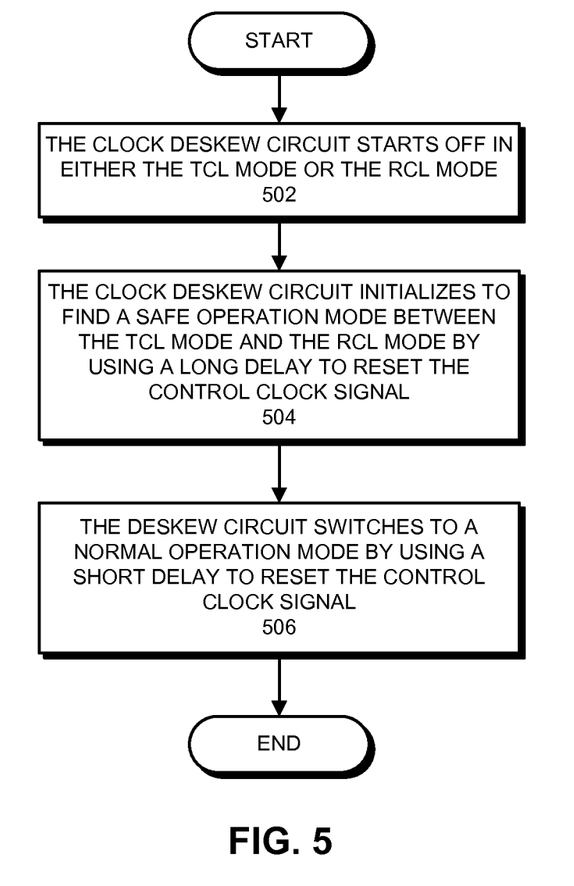
FIG. 5 presents a flowchart illustrating a process of operating a clock deskew circuit to allow safe data transfer across clock domains of unknown phase offset in accordance with an embodiment of the present disclosure.

FIG. 5 presents a flowchart illustrating a process of operating a clock deskew circuit to allow safe data transfer across clock domains of unknown phase offset in accordance with an embodiment of the present disclosure. The process begins when the clock deskew circuit starts off in either the TCL mode or the RCL mode (step 502). Because of the unknown phase offset, the initial operation mode does not guarantee safe data transfer. Next, the clock deskew circuit initializes to find a safe operation mode between the TCL mode and the RCL mode by using a long delay to reset the control clock signal (step 504). Note that the long delay allows the clock deskew circuit to transition from an unsafe operation mode to a safe operation mode by ignoring those clock events that happen too soon after the control clock signal. The deskew circuit then switches to a normal operation mode by using a short delay to reset the control clock signal (step 506). Note that by using the short delay, the clock deskew circuit becomes more jitter tolerant if the next rising edge of the receiver clock or transmitter clock happens early due to jitter.

Note that clock deskew circuit 100 described in conjunction with FIGS. 1-5 may be used in a variety of applications.

Figure 6:
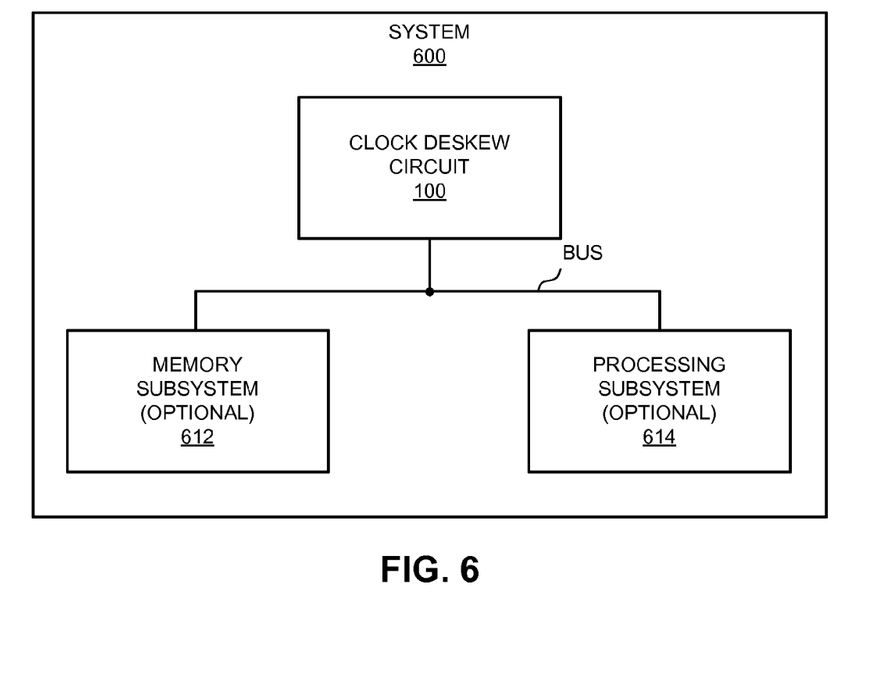
FIG. 6 presents a block diagram illustrating a system that includes a clock deskew circuit in accordance with an embodiment of the present disclosure.

This is shown in FIG. 6, which presents a block diagram illustrating a system 600 that includes clock deskew circuit 100.

System 600 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. Note that a given computer system may be at one location or may be distributed over multiple, geographically dispersed locations.

Moreover, the clock deskew circuit 100, as well as system 600, may include fewer components or additional components. Although these embodiments are illustrated as having a number of discrete items, these circuit components, integrated circuits and the system are intended to be functional descriptions of the various features that may be present rather than structural schematics of the embodiments described herein. Consequently, in these embodiments two or more components may be combined into a single component, and/or a position of one or more components may be changed.

In addition, functionality in the preceding embodiments of the integrated circuits and the system may be implemented more in hardware and less in software, or less in hardware and more in software, as is known in the art. For example, functionality may be implemented in one or more application-specific integrated circuits (ASICs) and/or one or more digital signal processors (DSPs). As shown in FIG. 6, system 600 may include one or more program modules or sets of instructions stored in an optional memory subsystem 612 (such as DRAM or another type of volatile or non-volatile computer-readable memory), which may be executed by an optional processing subsystem 614. Note that the one or more computer programs may constitute a computer-program mechanism.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A clock deskew circuit for safely transferring data from a first clock domain to a second clock domain, comprising:
   a data path circuit, comprising:
      a transmitter latch controlled by a transmitter clock in a first clock domain;
      a receiver latch controlled by a receiver clock in a second clock domain, wherein the transmitter clock and the receiver clock have an unknown phase offset; and
      an intermediate latch coupled between the transmitter latch and the receiver latch; and
   a control circuit coupled between the transmitter clock and the receiver clock, and configured to generate a control clock for the intermediate latch based on both the transmitter clock and the receiver clock, wherein the control circuit operates to select between a first operation mode and a second operation mode for the data path circuit based at least on the phase relationship of the control clock with respect to the transmitter clock and the receiver clock,
   wherein in the first operation mode, a triggering transition of the control clock occurs after the latest triggering transition of the transmitter clock but before the next triggering transition of the receiver clock; and
   wherein in the second operation mode, the triggering transition of the control clock occurs after the latest triggering transition of the receiver clock but before the next triggering transition of the transmitter clock.

2. The clock deskew circuit of claim 1, wherein if the data path circuit initially operates in the first operation mode,
   the control circuit selects the first operation mode for the data path circuit if the triggering transition of the control clock occurs at least a first predetermined time before the next triggering transition of the receiver clock; and
   otherwise, the control circuit selects the second operation mode for the data path circuit.

3. The clock deskew circuit of claim 2, wherein the control circuit selects the second operation mode by ignoring the next triggering transition of the receiver clock.

4. The clock deskew circuit of claim 1, wherein if the data path circuit initially operates in the second operation mode,
   the control circuit selects the second operation mode for the data path circuit if the triggering transition of the control clock occurs at least a second predetermined time before the next triggering transition of the transition clock; and
   otherwise, the control circuit selects the first operation mode for the data path circuit.

5. The clock deskew circuit of claim 4, wherein the control circuit selects the first operation mode by ignoring the next triggering transition of the transmitter clock.

6. The clock deskew circuit of claim 1, wherein the control circuit further comprises:
   a first flip-flop controlled by the transmitter clock, wherein the first flip-flop is configured to output a delayed version of the transmitter clock;
   a second flip-flop controlled by the receiver clock, wherein the second flip-flop is configured to output a delayed version of the receiver clock; and
   a logic gate which receives the delayed version of the transmitter clock and the delayed version of the receiver clock and generates the control clock.

7. The clock deskew circuit of claim 6, wherein the control circuit further comprises a delay circuit coupled between the logic gate and the first and second flip-flops, wherein the delay circuit receives the control clock from the logic gate and generates a delayed version of the control clock which is coupled to the reset inputs of the first and second flip-flops.

8. The clock deskew circuit of claim 6, wherein both the data input of the first flip-flop and the data input of the second flip-flop are set to logic high.

9. The clock deskew circuit of claim 6, wherein the logic gate is an AND gate or a NAND gate.

10. The clock deskew circuit of claim 6, wherein both the first flip-flop and the second flip-flop are D flip-flops.

11. The clock deskew circuit of claim 7, wherein the delay circuit is configured with a first predetermined delay such that a clock transition in either the transmitter clock or the receiver clock that occurs during a timing period from a triggering transition of the control clock to the end of the first predetermined delay after the triggering transition is ignored by the control circuit.

12. The clock deskew circuit of claim 11, wherein the delay circuit is configured with a second predetermined delay that is significantly shorter than the first delay, wherein a difference between the first predetermined delay and the second predetermined delay comprises a jitter tolerance value.

13. The clock deskew circuit of claim 1, wherein the transmitter clock and the receiver clock have the same frequency.

14. A method for safely transferring data from a first clock domain to a second clock domain, the method comprising:
   initializing a data path circuit, which comprises:
      a transmitter latch controlled by a transmitter clock in a first clock domain;
      a receiver latch controlled by a receiver clock in a second clock domain, wherein the transmitter clock and the receiver clock have an unknown phase offset; and
      an intermediate latch coupled between the transmitter latch and the receiver latch;
   generating a control clock for the intermediate latch using a control circuit coupled between the transmitter clock and the receiver clock, wherein the control clock is generated based on both the transmitter clock and the receiver clock; and
   using the control circuit to select between a first operation mode and a second operation mode for the data path circuit based at least on the phase relationship of the control clock with respect to the transmitter clock and the receiver clock,
   wherein in the first operation mode, a triggering transition of the control clock occurs after the latest triggering transition of the transmitter clock but before the next triggering transition of the receiver clock; and
   wherein in the second operation mode, the triggering transition of the control clock occurs after the latest triggering transition of the receiver clock but before the next triggering transition of the transmitter clock.

15. The method of claim 14, wherein if the data path circuit initially operates in the first operation mode, the method further comprises:
   selecting the first operation mode for the data path circuit if the triggering transition of the control clock occurs at least a first predetermined time before the next triggering transition of the receiver clock; and
   otherwise, selecting the second operation mode for the data path circuit.

16. The method of claim 14, wherein if the data path circuit initially operates in the second operation mode, the method further comprises:
   selecting the second operation mode for the data path circuit if the triggering transition of the control clock occurs at least a second predetermined time before the next triggering transition of the transition clock; and
   otherwise, selecting the first operation mode for the data path circuit.

17. A system, comprising:
   a processor;
   a memory;
   an integrated circuit that includes a clock deskew circuit, which further comprises:
      a data path circuit, comprising:
         a transmitter latch controlled by a transmitter clock in a first clock domain;
         a receiver latch controlled by a receiver clock in a second clock domain, wherein the transmitter clock and the receiver clock have an unknown phase offset; and
         an intermediate latch coupled between the transmitter latch and the receiver latch; and
      a control circuit coupled between the transmitter clock and the receiver clock, and configured to generate a control clock for the intermediate latch based on both the transmitter clock and the receiver clock, wherein the control circuit operates to select between a first operation mode and a second operation mode for the data path circuit based at least on the phase relationship of the control clock with respect to the transmitter clock and the receiver clock,
   wherein in the first operation mode, a triggering transition of the control clock occurs after the latest triggering transition of the transmitter clock but before the next triggering transition of the receiver clock; and
   wherein in the second operation mode, the triggering transition of the control clock occurs after the latest triggering transition of the receiver clock but before the next triggering transition of the transmitter clock.

* * * * *